United States Patent
Tsuchida et al.

(10) Patent No.: US 8,435,615 B2
(45) Date of Patent: May 7, 2013

(54) HOLLOW FOAMED BLOW-MOLDED ARTICLE

(75) Inventors: Shohei Tsuchida, Tochigi (JP); Tomoo Tokiwa, Tochigi (JP); Masato Naito, Tochigi (JP)

(73) Assignee: JSP Corporation (JP)

( * ) Notice: Subject to any disclaimer, the term of this patent is extended or adjusted under 35 U.S.C. 154(b) by 0 days.

(21) Appl. No.: 13/273,443

(22) Filed: Oct. 14, 2011

(65) Prior Publication Data

US 2012/0135173 A1 May 31, 2012

(51) Int. Cl.
*B32B 1/00* (2006.01)
*B32B 1/02* (2006.01)
*B32B 1/08* (2006.01)

(52) U.S. Cl.
USPC .... 428/36.5; 428/36.9; 428/36.91; 428/36.92

(58) Field of Classification Search .................. 428/34.1, 428/35.7, 36.4–36.7, 36.9–36.92
See application file for complete search history.

(56) References Cited

U.S. PATENT DOCUMENTS

| 6,077,907 A * | 6/2000 | Raetzsch et al. ............. 525/191 |
| 6,432,525 B1 | 8/2002 | Gokuraku et al. |
| 2007/0031622 A1 | 2/2007 | Imanari et al. |
| 2011/0104414 A1 | 5/2011 | Onodera et al. |

FOREIGN PATENT DOCUMENTS

| JP | 2004-122488 A | 4/2004 |
| WO | WO-2011/118281 A1 | 9/2011 |

* cited by examiner

*Primary Examiner* — Walter B Aughenbaugh
(74) *Attorney, Agent, or Firm* — Bacon & Thomas, PLLC (57) ABSTRACT

A hollow foamed blow-molded article has a polypropylene-based resin foam layer, wherein the polypropylene-based resin foam layer has an equilibrium compliance $Je_0$ of $2.0 \times 10^{-3}$ $Pa^{-1}$ or more and a swell S of 2.5 or less, wherein the foam layer has an apparent density "d" of 0.20 to 0.65 g/cm$^3$ and a ratio a/c of an average cell diameter "a" in the thickness direction of the molded article to an average cell diameter "c" in the longitudinal direction of the molded article of 0.1 to 0.5. The hollow foamed blow-molded article has an average molded article thickness T of 1 to 5 mm and a variation coefficient Cv of the molded article thickness of 50% or less.

6 Claims, 4 Drawing Sheets

HOLLOW FOAMED BLOW-MOLDED ARTICLE

DETAIL DESCRIPTION OF THE INVENTION

1. Technical Field

The present invention relates to a hollow foamed blow-molded article obtained by foam blow-molding.

2. Background Art

A foam blow-molding process has begun to be used in recent year for the production of a hollow molded article having a foam layer. Various methods have been hitherto proposed for the foam blow-molding. A generally adopted method includes melting and kneading a base resin and a blowing agent in an extruder, extruding the molten mixture through a die to obtain a tubular foam parison, sandwiching the foam parison between molds, and subjecting the parison to blow-molding. For example, there are known techniques disclosed in Patent Documents 1 and 2.

Hollow foamed molded articles obtained by such methods are excellent in light weight and heat insulation property and, therefore, may be utilized for applications such as receptacles, ducts, automobile parts and electric appliance parts. Especially, because hollow foamed molded articles of a polypropylene-based resin have excellent balance between their heat resistance and rigidity, they are expected to be utilized as air conditioner ducts for automobiles.

As air conditioner ducts for automobiles, non-foam resin ducts produced by blow-molding have been conventionally widely used. Such automobile air conditioner ducts have unavoidably complicated shapes because they are installed in a limited space. Yet, the automobile air conditioner ducts are required to have a reduced air flow resistance in order ensure a required level of air flow capacity. Thus, thin-walled air conditioner ducts of a non-foam resin have been demanded and produced by blow-molding in order to increase the cross-sectional area of the hollow portion of thereof.

With the foam blow-molding technique, however, it has not been possible to obtain a light weight, thin-walled hollow foamed molded article made of a polypropylene-based resin. For example, there is known a hollow foamed molded article of a polyolefin-based resin obtained by blow-molding using a chemical blowing agent. Although the use of a chemical blowing agent can afford a thin-walled product, the hollow molded article obtained has an apparent density of above 0.7 g/cm$^3$ and is insufficient in lightness in weight and in appearance. Also known is a hollow foamed molded article of a polypropylene-based resin which is produced by foam blow-molding of a specific polypropylene resin having a high melt strength using a physical blowing agent such as butane. Although the use of the physical blowing agent such as butane can produce a hollow molding having a light weight and a low apparent density, the thickness thereof is large.

Incidentally, in the conventional blow-molding technique using a chemical blowing agent, when the chemical blowing agent is used in an increased amount, it is difficult to obtain a hollow foamed molded article of a polypropylene-based resin which has an apparent density of 0.7 g/cm$^3$ or less and which has uniform thickness. In the conventional blow-molding technique using a physical blowing agent, when a die lip having a small clearance is used for the purpose of reducing the thickness of an extruded foam parison so as to obtain a thin-walled hollow foamed molded article, significant corrugation unavoidably occurs so that the uniformity of the thickness of the obtained hollow foamed molded article is deteriorated. Thus, it has been impossible to obtain a light weight foamed molded article having a thin and uniform thickness. Although use of the blowing agent in a reduced amount could give a hollow foamed molded article having a reduced thickness, it is not possible to significantly reduce the thickness without deterioration of the thickness uniformity. Thus, in this case too, it has been impossible to obtain a light weight foamed molded article having a thin and uniform thickness.

The conventional hollow foamed molded article of a polypropylene-based resin is thus either a thin thickness one having a large apparent density or a thick thickness one having a small apparent density. Namely, with the conventional technique, it is difficult to produce a hollow foamed molded article of a polypropylene-based resin having a thin thickness, a low apparent density and yet an accurate thickness.

Incidentally, inaccuracy of thickness of a molded article results in the formation of a thin portion. Such a thin portion has a reduced strength. In order to satisfy a required strength, it is necessary to consider the strength of such a thin portion in design of the average thickness of hollow foamed molded articles. Thus, inaccuracy of thickness of a molded article unavoidably results an increase of the thickness of the molded article as a whole. Therefore, light weight is not sufficiently achieved.

As a method for solving the above problems, the present applicant has proposed a process for producing a hollow foamed blow-molded article having a thin and uniform thickness by forming a foam parison using a polypropylene-based resin having an equilibrium compliance $Je_0$ of $0.5\times10^{-3}$ to $1.8\times10^{-3}$ $Pa^{-1}$ and a swell S of 2.5 or less (Patent Document 3). Here, the equilibrium compliance $Je_0$ is a measure of foamability of the resin. It is known before the application date of Patent Document 3 that a good foamability is obtained when the equilibrium compliance value is in a specific range. In Patent Document 3, a small value is selected from the above equilibrium compliance $Je_0$ value range that gives a good foamability and, at the same time, a propylene-based resin having a small swell S is selected. By so doing, while ensuring an adequate foamability of the resin, swelling of the foam parison due to the swelling by foaming and the swelling of the resin itself is suppressed, with the result that formation of a thin-walled hollow foamed molded article is achieved.

PRIOR ART

Patent Document

Patent Document 1: International Publication WO99/28111
Patent Document 2: JP-A-2004-122488
Patent Document 3: JP-A-2007-62364

SUMMARY OF THE INVENTION

Problems to be Solved by the Invention

The technique of Patent Document 3 is to achieve a thin-wall thickness of hollow foamed molded articles by selecting a resin having a low equilibrium compliance $Je_0$ which falls in such a range as to obtain good foamability. However, in foam blow-molding, formation of a foam parison using a resin that has high foamability, i.e. that has a high equilibrium compliance $Je_0$, can give improved controllability of the foaming conditions and good blow-molding capability.

In designing of a hollow foamed blow-molded article which is intended to be used as a vehicle air conditioner duct having a limited structure, the molded article is required to have a complicated shape that can be accommodated in a limited narrow space. Therefore, the equilibrium compliance $Je_0$ of the hollow foamed molded article is desired to have a high value rather than a low value in a range that gives good foamability, since freedom of the design of its shape is increased so that it is possible to obtain a molded article having a more complicated shape.

In the technique of Patent Document 3, however, there is a restriction that a resin having a low equilibrium compliance $Je_0$ which falls in such a range as to obtain good foamability must be used for producing a hollow foamed molded article. Therefore, freedom of the design of its shape tends to be restricted. In this respect, there is a room for improvement. Namely, hitherto there exist no hollow foamed molded articles that have a foamed layer which is formed of a polypropylene-based resin having a high equilibrium compliance $Je_0$ and that have a thin thickness and a highly precise thickness.

It is an object of the present invention to solve the above problems of the conventional technique and to provide a hollow foamed blow-molded article that has a polypropylene-based resin foam layer having an equilibrium compliance $Je_0$ of $2.0 \times 10^{-3}$ $Pa^{-1}$ or more and excellent foamability and that has a light weight and a thin uniform thickness.

Means for Solving the Problems

The present inventors have made an earnest study and, as a result, have found that, when an extruded foam parison of a polypropylene-based resin has an equilibrium compliance $Je_0$ of $2.0 \times 10^{-3}$ $Pa^{-1}$ or more and even when the thickness increases to a certain degree, the resin having such a high equilibrium compliance $Je_0$ can be uniformly stretched, because of its good foamability. It has been revealed that it is possible to obtain a hollow foamed blow-molded article which is light weight, thin-walled and uniform in thickness by, for example, subjecting a thin-walled foam parison which has been uniformly stretched in the extrusion direction, to blow-molding. The present invention has been completed by such findings.

That is, according to the present invention there is provided the following hollow foamed blow-molded article.

A hollow foamed blow-molded article having a polypropylene-based resin foam layer, wherein the polypropylene-based resin foam layer has an equilibrium compliance $Je_0$ of $2.0 \times 10^{-3}$ $Pa^{-1}$ or more and a swell S of 2.5 or less, wherein the foam layer has an apparent density "d" of 0.20 to 0.65 g/cm³ and a ratio a/c of an average cell diameter "a" in the thickness direction of the molded article to an average cell diameter "c" in the longitudinal direction of the molded article of 0.1 to 0.5, and wherein the hollow foamed blow-molded article has an average molded article thickness T of 1 to 5 mm and a variation coefficient Cv of the molded article thickness of 50% or less.

A hollow foamed blow-molded article as recited in the above [1], wherein the average molded article thickness T of the hollow foamed blow-molded article is 1 mm or more and less than 2.3 mm.

[3] A hollow foamed blow-molded article as recited in the above [1] or [2], wherein the apparent density "d" of the polypropylene-based resin foam layer is 0.25 to 0.65 g/cm³.

[4] A hollow foamed blow-molded article as recited in any one of the above [1] to [3], wherein the equilibrium compliance $Je_0$ of the polypropylene-based resin foam layer is $3.0 \times 10^{-3}$ $Pa^{-1}$ or more and the swell S thereof is 1 to 2.5.

[5] A hollow foamed blow-molded article as recited in any one of the above [1] to [4], wherein the hollow foamed blow-molded article is an air conditioner duct for vehicles.

Effect of the Invention

Although the foam layer of the hollow foamed blow-molded article of the present invention has a high an equilibrium compliance $Je_0$, the hollow foamed molded article is light weight, thin-walled and uniform in thickness. Since it is possible to achieve more lightness in weight as compared with the conventional products, the hollow foamed blow-molded article may be suitably used for applications, such as air conditioner ducts of vehicles having complicated shapes, in which light weight and highly free shape design are required.

BRIEF DESCRIPTION OF THE DRAWINGS

FIG. 2 (a) is a vertical elevational view showing a hollow foamed molded article in the form of a duct for an automobile, (b) is a side view thereof and (c) is a plan view thereof.

FIG. 5(a) and (b) are views explanatory of the maximum width of hollow foamed molded articles.

BEST MODE FOR CARRYING OUT THE INVENTION

A hollow foamed blow-molded article according to the present invention is a polypropylene-based resin foamed blow-molded article having a specific equilibrium compliance $Je_0$ and is a hollow foamed blow-molded article (hereinafter referred to simply as "molded article" or "hollow foamed molded article") having a thin and uniform thickness.

The term "foam blow-molding" in the present invention is intended to refer to a method for producing a hollow foamed molded article which method comprises extruding a foamable molten polypropylene-based resin containing a physical blowing agent through a die to obtain a foam parison in a softened state having a polypropylene-based resin foam layer, sandwiching the foam parison between molds, blowing a gas into the inside of the foam parison to mold (blow-mold) the foam parison into a desired shape, and thereafter taking the molded article from the molds.

Figure 1:
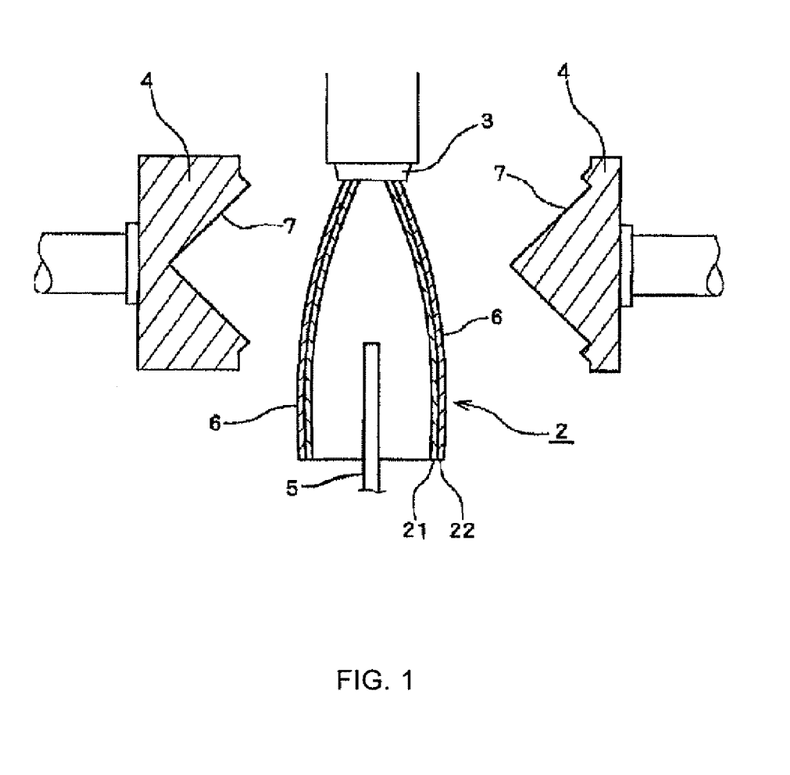
FIG. 1 is a view for explaining an embodiment of a method for producing a hollow foamed blow-molded article of the present invention.

An embodiment of the foam blow-molding will be described with reference to the drawings. Referring to FIG. 1, a polypropylene-based resin and a physical blowing agent are kneaded in an extruder (not shown) to form a foamable molten resin, and the resulting foamable molten resin is extruded from through a die 3 to a lower pressure zone to obtain a foam parison 2 having a polypropylene-based resin foam layer (hereinafter occasionally simply referred to as "foam layer") 21. The foam parison 2 in a softened state is placed between two separable molds 4 and 4 having a desired shape. By closure of the molds 4 and 4, the foam parison is sandwiched between the molds. A gas (generally air) pressurized to such a degree as not to destroy the cells of the foam layer 21 is blown from a gas injection port 5 into the foam parison 2 to blow-mold the foam parison 2 into a hollow body. After cooling, the thus obtained hollow body is taken out of the blow molds, thereby obtaining a hollow foamed molded article. Incidentally, FIG. 1 is a view explanatory of an embodiment of the production method for the molded article according to the present invention. In FIG. 1, the reference numeral 2 denotes the foam parison, 21 denotes a foam layer of the foam parison, 22 denotes a non-foamed thermoplastic resin layer which is optionally provided, 3 denotes the die, 4 denotes the mold, 5 denotes the gas injection port, 6 denotes an outside surface of the foam parison 2, and 7 denotes an inside surface of the mold 4. It should be noted, however, that FIG. 1 is an explanatory view schematically illustrating an example of the production method for the molded article according to the present invention and that the concrete operational procedures of the production method for the molded article according to the present invention are not limited to those illustrated in FIG. 1.

In the method for producing the molded article of the present invention, it is preferred that an accumulator be disposed within the die 3 and it is more preferred that an accumulator be disposed between the die 3 and the extruder, since a further big foam parison can be formed.

When a mold provided with an evacuation piping (not shown) is used as the mold 4, it is possible to carry out the molding while evacuating the mold. By this expedience, the exterior surface 6 of the foam parison 2 can be closely contacted with the inside surface 7 of the mold 4 to give a hollow foamed molded article that conforms to the shape of the mold and that has a good appearance.

Figure 2:
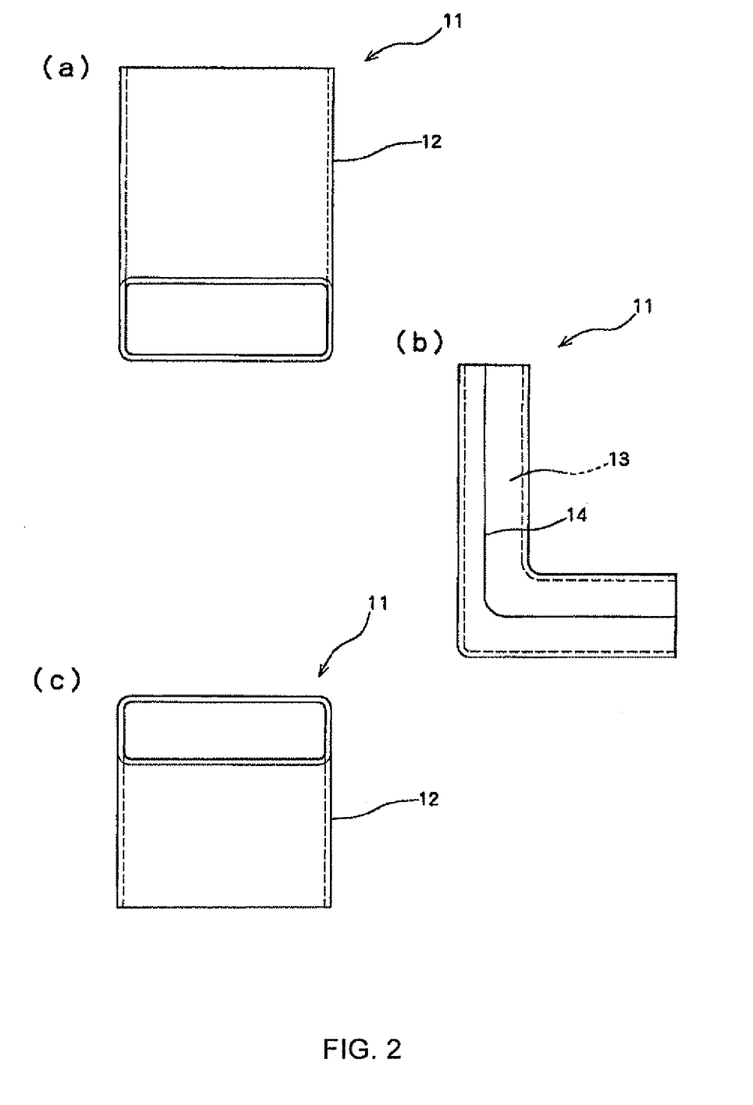

FIG. 2 depicts an example of the hollow foamed molded article of the present invention. The hollow foamed molded article 11 shown in FIG. 2 is a duct for air conditioners for automobiles having a tubular portion 12 which constitutes a peripheral wall of the air conditioner duct. The molded article has a hollow portion 13 serving as air flow passage of the air conditioner duct. However, the hollow foamed molded article of the present invention is not limited only to a duct for air conditioners for automobiles.

FIG. 2(a) is an elevational view showing the hollow foamed molded article formed as an air conditioner duct, FIG. 2(b) is a side view of FIG. 2(a), and FIG. 2(c) is a plan view of FIG. 2(a). In FIG. 2, the reference numeral 11 denotes the hollow foamed molded article, 12 denotes the tubular portion of the molded article, 13 denotes the hollow portion, and 14 denotes a residual mark (parting line) formed during the cutting by the molds.

The hollow foamed molded article of the present invention has an average molded article thickness (an average thickness of the side wall of the molded article) of 1 to 5 mm and a variation coefficient Cv of the thickness of the molded article of 50% or less. When the average molded article thickness T of the molded article is less than 1 mm, there is a possibility that the mechanical strengths such as a bending strength and the heat insulating properties are excessively reduced due to the excessively thin thickness. On the other hand, when the average thickness T exceeds 5 mm, there is a possibility that the thickness tends to become non-uniform in case where the hollow foamed molded article has a complicated shape. In addition to this defect, there is a possibility that an air flow resistance excessively increases because the sectional area of the hollow portion becomes relatively small especially when the molded article is used as a duct for an automobile air conditioner. From this point of view, the upper limit of the average molded article thickness T is preferably 3 mm, more preferably less than 2.3 mm, still more preferably 2.0 mm, while the lower limit is preferably 1.5 mm.

When the variation coefficient Cv of the molded article thickness is greater than 50%, there is a possibility that the mechanical strengths, such as compression strength and bending strength, and the heat insulating properties are apt to vary depending upon locations thereof. With such a hollow foamed molded article having a non-uniform thickness, it becomes difficult to achieve a reduction of the weight. From this point of view, it is desirable that the variation coefficient Cv be as small as possible. The upper limit of the variation coefficient Cv is preferably 35%, more preferably 25%, still more preferably 20%, particularly preferably 15%. The lower limit of the variation coefficient Cv is 0.

The average molded article thickness T of the hollow foamed molded article in the present specification is as measured on three vertical cross-sections taken in the direction perpendicular to the longitudinal direction thereof at three positions thereof, i.e. near the midpoint of the direction of the hollow of the hollow foamed molded article (generally longitudinal direction) and near both end portions in the direction of the hollow (a position where the molded article has a special shape should be avoided for the measurement). Each of the three cross-sections is measured for the wall thickness in the thickness direction at six locations which are equally spaced from each other along the cut peripheral edge (peripheral direction) thereof. The average molded article thickness T is the arithmetic mean of the eighteen measured thickness values. The minimum value of the thickness values measured at the above eighteen locations represents the minimum thickness $T_{min}$ of the hollow foamed molded article.

The term "variation coefficient Cv of the molded article thickness" of the thickness of the molded article as used in the present specification is defined by the percentage of the standard variation (mm) of the thickness of the molded article relative to the average molded article thickness T (mm) of the molded article and represents a degree of variation from the average value. The standard variation V of the thickness of the molded article is calculated according to the following formula (1):

$$V = \{\Sigma(T_i - T)^2/(n-1)\}^{1/2} \quad (1)$$

wherein $T_i$ is a measured thickness value of each of the above-described eighteen locations, T is the above-described average molded article thickness, n is the number of the measurement (namely, 18) and $\Sigma$ means a sum of $(T_i - T)^2$ calculated for respective measured values. Thus, the variation coefficient Cv can be determined from the following formula (2) on the basis of the formula (1):

$$Cv(\%) = (V/T) \times 100 \quad (2)$$

As the polypropylene-based resin constituting the hollow foamed molded article of the present invention, there may be mentioned, for example, a polypropylene homopolymer, a propylene-ethylene copolymer, a propylene-butene copolymer and a propylene-ethylene-butene terpolymer. The polypropylene-based resin may additionally contain other polymer or polymers, as long as the objects and effects of the present invention can be fulfilled.

The hollow foamed molded article of the present invention, in which the foam layer has an equilibrium compliance $Je_0$ in the range of $2.0 \times 10^{-3}$ $Pa^{-1}$ or more is light weight, thin-walled and uniform in thickness. A hollow foamed molded article which has such an equilibrium compliance $Je_0$ and which is light weight, thin-walled and uniform in thickness has never been obtained hitherto. Incidentally, the range of the equilibrium compliance $Je_0$ of the foam layer rather than the range of the equilibrium compliance $Je_0$ of the raw material is specified in the present invention. The reason for this is as follows.

The molecular weight of a polypropylene-based resin is apt to decrease as a result of shearing history during extrusion etc., though depending upon the kind of the resin. Therefore, the equilibrium compliance $Je_0$ of the polypropylene-based resin that constitutes the hollow foamed molded article may be lower than the equilibrium compliance $Je_0$ of the raw material polypropylene-based resin. In foam blow-molding, the value of the equilibrium compliance $Je_0$ of the polypropylene-based resin at the time of foaming and blow-molding is more important than the value of the equilibrium compliance $Je_0$ of the raw material polypropylene-based resin. Since the value of the equilibrium compliance $Je_0$ of the polypropylene-based resin after the extrusion is nearly the same as the value of the equilibrium compliance $Je_0$ of the foam layer, it is the equilibrium compliance $Je_0$ of the foam layer that is specified in the present invention.

When the equilibrium compliance $Je_0$ of the foam layer has a high value within the specified range, namely when the polypropylene-based resin at the time of foaming and blow-molding shows a high value of the equilibrium compliance $Je_0$ in the specified range, the foamability thereof is improved so that not only the cell growth efficiency and the uniformity of the cell diameter but also the uniformity of the elongation is improved. Therefore, it is possible to mold a hollow foamed molded article having a complicated shape and uniform thickness. This follows that limitation of the design is reduced. Further, the hollow foamed molded article obtained has especially excellent physical properties such as mechanical strength and heat insulating properties. From this standpoint, the equilibrium compliance $Je_0$ of the foam layer is preferably $3.0 \times 10^{-3}$ $Pa^{-1}$ or more, more preferably $4.0 \times 10^{-3}$ $Pa^{-1}$ or more, still more preferably $5.0 \times 10^{-3}$ $Pa^{-1}$ or more. Incidentally, when the equilibrium compliance $Je_0$ is excessively high, there is a possibility that the production of a thin-walled foamed blow-molded article itself becomes difficult. For reasons of easiness in producing a thin-walled hollow foamed molded article, the upper limit of the equilibrium compliance $Je_0$ is preferably $25 \times 10^{-3}$ $Pa^{-1}$, more preferably $15 \times 10^{-3}$ $Pa^{-1}$, still more preferably $10 \times 10^{-3}$ $Pa^{-1}$.

Figure 3:
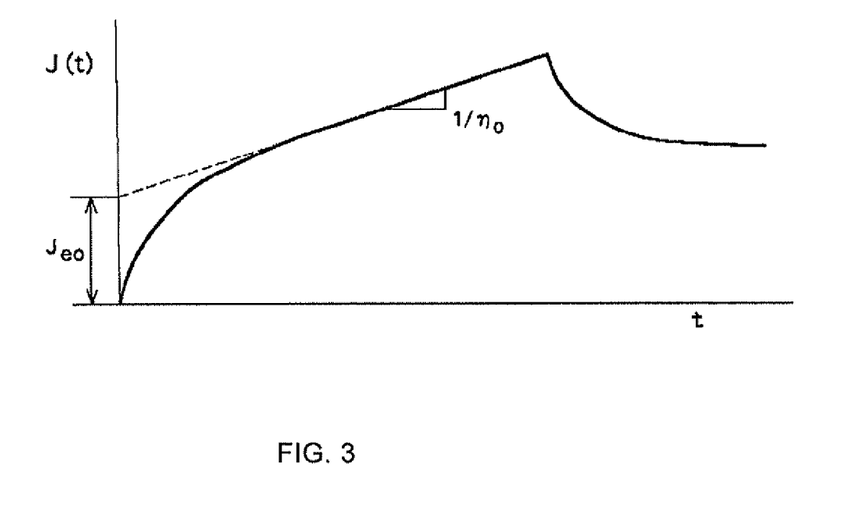
FIG. 3 is a view of an example of the results of measurement of creep compliance J(t) as function of time t.

The equilibrium compliance $Je_0$ is a measure of viscoelasticity (particularly elasticity) of a resin and can be determined by measuring the dependency of strain $\tau(t)$ on time t when a constant stress $\sigma_D$ is applied to a polypropylene-based resin in a melted state sandwiched between flat plates. When the constant stress $\sigma_D$ is applied to the melted polypropylene-based resin sandwiched between the flat plates, the strain $\tau$ initially increases rapidly. As time lapses, however, an equilibrium is established between the time t and the strain $\tau(t)$ (namely, a linear relationship is established therebetween). A creep compliance $J(t)=\tau(t)/\sigma_D$ is plotted as ordinate against the time t as abscissa. The equilibrium compliance $Je_0$ is the zero time (t=0) intercept of the extrapolation of the J(t) in the equilibrium state. An example of the results of the measurement of J(t) relative to the time t is shown in FIG. 3.

In theory, the following relationship exists between the time t and J(t):

$$J(t)=\tau(t)/\sigma_D=Je_0+t/\eta_0 \quad (3)$$

In the formula (3), $Je_0$ is the equilibrium compliance and $\eta_0$ is a zero shear viscosity.

The equilibrium compliance $Je_0$ determined in the above manner is influenced by a degree of polymer entanglement. It is considered that when the degree of the entanglement is large, the elasticity increases so that the equilibrium compliance $Je_0$ becomes large. Thus, the equilibrium compliance $Je_0$ is considered to be a measure of foamability of a resin. Namely, it is considered that since a resin having a suitable equilibrium compliance $Je_0$ has a suitable elasticity, a foam obtained by foaming a resin in a molten state has cells whose cell walls have suitable elasticity and show a strong resisting force against deformation, so that the cells are maintained in suitable cell conditions. Further, a resin having a large equilibrium compliance $Je_0$ has a large degree of polymer entanglement. Therefore, when such a resin is stretched in a molten state, local stretching is less liable to occur as compared with a resin having a small equilibrium compliance $Je_0$ and can be uniformly stretched as a whole. As a state of entanglement of polymers, there may be mentioned the presence of free long branched chains in its molecular structure and the presence of ultrahigh molecular weight components.

In order to achieve thin thickness and uniform thickness in a hollow foamed molded article having a foam layer with an equilibrium compliance $Je_0$ of $2.0 \times 10^{-3}$ $Pa^{-1}$ or more, it is necessary to form a thin-walled foam parison. In order to form a foam parison (foam layer) having a uniform, relatively thin thickness, it is necessary that swell S should fall within a specific range. The swell S is a measure of swelling of the resin itself in the thickness direction at the time of foaming. When the swell S is large, the resin swells excessively in the thickness direction, and it is not possible to obtain a thin foam layer. There are two type of swelling of a resin, namely swelling due to expansion of the resin itself and swelling due to foaming of the resin. As used in the present specification, the swell S concerns with swelling of the resin itself.

In the present invention, in order to prevent the foam parison from becoming excessively thick due to swelling of the resin itself, it is necessary that swell S should be 2.5 or less. Since the swell S does not give a significant influence upon the foamability of the resin, unlike the equilibrium compliance $Je_0$, it is desired that swell S be as small as possible from the standpoint of forming a thin-walled foam parison. Thus, swell S is preferably 2.3 or less. The lower limit of swell S is about 1. Incidentally, the range of the swell S of the foam layer rather than the range of the swell S of the raw material is specified in the present invention. The reason for this is that, likewise the equilibrium compliance $Je_0$, the molecular weight of a polypropylene-based resin is apt to be reduced as a result of its shearing history during extrusion, so that the swell S of the polypropylene-based resin after the extrusion may be lower than the swell S of the raw material polypropylene-based resin.

The equilibrium compliance $Je_0$ and the swell S as used in the present specification are measured as follows.

The equilibrium compliance $Je_0$ is measured using a dynamic viscoelasticity measuring machine (Dynamic Analyzer Model SR200 manufactured by Rheometrics Scientific F. E. Ltd.).

First, a resin is compression molded at 260° C. under a pressure of 8,000 kPa for 5 minutes using a heat press to obtain a sample resin plate for measurement with a thickness of 2 mm, from which a disc sample with a diameter of 25 mm is prepared. When a measuring sample is prepared from a hollow foamed molded article, the hollow foamed molded article is heated and defoamed by heating in a vacuum oven or the like. In this case, the defoaming conditions should be at a temperature higher than the melting point of the polypropylene-based resin constituting the hollow foamed molded article but lower than the temperature at which decomposition of the resin excessively takes place, and under a reduced pressure. Next, the disc sample is sandwiched between parallel plates (diameter: 25 mm) of the dynamic viscoelasticity measuring machine. The assembly is heated to 210° C. and allowed to stand for about 10 minutes in a nitrogen atmosphere. Then, the gap between the parallel plates is reduced to 1.4 mm and the molten resin leaked from the parallel plates is removed. Then, a constant stress $\sigma_c$ of 100 Pa is applied to the sample by rotating the upper plate and the change of strain $\tau(t)$ with time is measured. The zero time (t=0) is the time point at which the application of the constant stress has started. Initially τ(t) increases abruptly but, with time, increases gradually. After a sufficient time has lapsed, τ(t) changes linearly with time. Dynamic Analyzer Model SR200 is set under the conditions shown Table 1 and is adapted to automatically calculate the equilibrium compliance.

TABLE 1

| TEST PARAMETERS: | |
|---|---|
| Save Geometry As | |
| Geometry Type | Parallel plates (ParaPlate) |
| Diameter | 25.0 [mm] |
| Gap | 1.4 [mm] |
| Tool Inertia | 376.6 [gm° cm>>] |
| Test Type | Step Stress (Creep) (StpStress) |
| Save Setup As | |
| Temperature | 210.0 [½ C.] |
| Sampling Mode | Linear |
| Points Per Zone | 200 [ ] |
| Stress | 1000.0, 0.0, 0.0, 0.0, 0.0, 0.0, 0.0, 0.0 [dynes/cm>>] |
| Zone Time | 5:00, 16:40, 0, 0, 0, 0, 0, 0 [s or h:m:s] |
| PreShear Mode | Preshear Off |
| Delay Before Test | On |
| Delay Before Test | 20:00 [s or h:m:s] |
| Analog Data Collection | Off |
| Automatic Steady State | Disabled |
| Acceptance Window | 1.0 [%] |
| Strain Limit: | End Zone When Allowed Strain is Exceeded Off |
| Maximum Allowed Strain | 100.0 [%] |
| Turn Off Motor | No |
| Turn Hold On | No |
| Turn Off Temp Controller | No |
| Set End of Test Temp | No |
| END TEST PARAMETERS | |

The swell S is measured using Melt Tension Tester Model II (manufactured by Toyo Seiki Seisaku-Sho Ltd.). A resin is extruded through a cylindrical orifice having an orifice diameter of 2.095 mm and a length of 8 mm at a resin temperature of 210° C. and a piston speed of 10 mm/minute. The diameter of the extruded string-shaped resin which is in an elastic recovery swelling state at a position 10 mm below the lower end of the orifice is measured. The swell S is determined by calculation of a ratio of the measured diameter to the orifice diameter.

The foam layer of the hollow foamed molded article of the present invention has an equilibrium compliance $Je_0$ of $2.0 \times 10^{-3}$ $Pa^{-1}$ or more and a swell S of 2.5 or less. As described previously, the equilibrium compliance $Je_0$ and swell S of a polypropylene-based resin decrease as a result of its shearing history during extrusion, etc. So that the equilibrium compliance $Je_0$ and swell S of the foam layer fall within the above-mentioned specific ranges, use is generally made of a raw material polypropylene-based resin (including a mixture of two or more polypropylene-based resins) having an equilibrium compliance $Je_0$ of about $3.0 \times 10^{-3}$ $Pa^{-1}$ or more and a swell S of about 2.7 or less. As the polypropylene-based resin having a high equilibrium compliance $Je_0$, there may be mentioned high melt strength polypropylenes such as those having free long branched molecular chains or ultrahigh molecular weight components in their polymer structures. In order for the equilibrium compliance $Je_0$ and swell S of the foam layer to fall within the above-mentioned specific ranges, a single one of commercially available high melt strength polypropylene-based resins may be suitably selected and used. However, for the reasons as set forth below, it is preferred that two or more high melt strength polypropylene-based resins be used as a mixture.

Namely, generally preferably used as a high melt strength polypropylene-based resin for blow-molding is a branched, high melt strength polypropylene-based resin (BHMS-PP) which has long chain branches in the molecular structure and has a high equilibrium compliance $Je_0$ before extrusion. When subjected to shear forces during extrusion, the equilibrium compliance $Je_0$ of this resin decreases and does not fall within the above-mentioned specific range at the time of foaming. Because of this problem, when BHMS-PP is extruded by itself, it is difficult to satisfy the required equilibrium compliance $Je_0$ and swell S simultaneously. On the other hand, when recovered BHMS-PP which has once been subjected to extrusion (recycled BHMS-PP raw material) is again extruded to foam a foam parison and when the resulting foam parison is molded into a hollow foamed molded article, each of the equilibrium compliance $Je_0$ and swell S values thereof does not significantly change before and after the extrusion, unlike the case of the first time extrusion.

Therefore, in a process for producing a molded article having a foam layer, whose equilibrium compliance $Je_0$ and swell S are so controlled as to fall within the above-described specific ranges, from a foam parison obtained by extruding a commercially available polypropylene-based resin, the above-mentioned BHMS-PP and/or recycled BHMS-PP raw material may be properly mixed with a polypropylene-based resin which is other than these PP and which has a high equilibrium compliance $Je_0$ (high $Je_0$-PP), the resulting mixture being extruded to form the foam parison. By so doing, it is possible to stably form a foam layer whose equilibrium compliance $Je_0$ and swell S fall within the above-described specific ranges.

Specific examples of the above-mentioned BHMS-PP include "WB130HMS" manufactured by Borealis AG. The above-mentioned high $Je_0$-PP preferably has an equilibrium compliance $Je_0$ of $3.0 \times 10^{-3}$ $Pa^{-1}$ or more, more preferably $5.0 \times 10^{-3}$ $Pa^{-1}$ or more, still more preferably $7.0 \times 10^{-3}$ $Pa^{-1}$ or more. When the equilibrium compliance $Je_0$ of the high $Je_0$-PP is within the above-specified range, it is easy to control values of the equilibrium compliance $Je_0$ and swell S of the foam layer to the above-mentioned specific ranges. Examples of the high $Je_0$-PP include linear high melt strength polypropylene-based resins containing ultra-high molecular weight components. As a specific example of the high $Je_0$-PP, there may be mentioned "FB3312" manufactured by Japan Polypropylene Corporation.

When a recycled raw material from a molded article having a foam layer which is obtained by extruding a mixture of the above-mentioned BHMS-PP and high $Je_0$-PP and which has equilibrium compliance $Je_0$ and swell S values that fall within the above-specified ranges (recycled high $Je_0$-PP raw material) is again extruded to form a foam parison, the equilibrium compliance $Je_0$ and swell S values do no change remarkably before and after the extrusion. Thus, the equilibrium compliance $Je_0$ and swell S values after the extrusion fall within the above-mentioned specific ranges. Therefore, it is possible to adjust the equilibrium compliance $Je_0$ and swell S of a foam layer of the intended molded article to the above-mentioned specific ranges by using the recycled high $Je_0$-PP raw material by itself or by using a mixture of the recycled high $Je_0$-PP raw material with the BHMS-PP or high $Je_0$-PP.

A total proportion of the high $Je_0$-PP and/or the recycled high $Je_0$-PP raw material is suitably adjusted depending upon the equilibrium compliance $Je_0$ and swell S of the desired foam layer and is preferably 5 to 95% by weight, more preferably 10 to 80% by weight, still more preferably 15 to 70% by weight, based on the polypropylene-based resin for reasons of easiness in production of a hollow foamed molded article having an improved precision of thickness.

Incidentally, since values of the equilibrium compliance $Je_0$ and swell S change before and after the extrusion due to shearing history at the time of the extrusion as described previously, it is necessary to previously extrude the raw material resin under the same conditions as those in the actual production and to confirm approximate values of the equilibrium compliance $Je_0$ and swell S beforehand.

The polypropylene-based resin which forms the foam layer of the foam parison may contain an auxiliary component, such as a polyethylene resin (e.g., a high density polyethylene resin, a low density polyethylene resin and a linear low density polyethylene), a thermoplastic elastomer (e.g., a styrene-butadiene-styrene block copolymer), an ethylene-propylene rubber and a polystyrene-based resin, as long as the equilibrium compliance $Je_0$ and swell S thereof fall within the above described specific ranges.

The polypropylene-based resin which constitutes the foam layer of the foam parison preferably has a melt flow rate of 3 to 20 g/10 min with the consideration of a balance between moldability thereof and physical properties of the hollow foamed molded article.

The melt flow rate herein is a melt mass flow rate as measured in accordance with JIS K 7210 (1999), Test Method A at a test temperature of 230° C. and a load of 2.16 kg.

The foam parison produced by a method for producing the molded article of the present invention may have a multi-layer structure including a foam layer and a resin layer. In this case, the resin layer may be provided in either one of the both surfaces of the foam layer. Alternately, the foam layer may be provided between resin layers (sandwich structure). The hollow foamed molded article obtained from such a parison having a resin layer or layers has improved strength. Further, because of the presence of the resin layer on at least an outer surface side of the foam layer, the molded article has a good appearance. In addition, the provision of a resin layer is also preferable because it is easy to impart desired additional function, such as antibacterial property and deodorizing property, to the hollow foamed molded article by using a resin layer made of a resin having such a property. In the case of using a multi-layer foam parison, the thickness of the resin layer of the foam parison is such that the thickness of the resin layer of the hollow foamed molded article is preferably 0.1 to 1.5 mm, more preferably 0.5 to 1.0 mm. To achieve this purpose, the thickness of the resin layer of the multi-layer foam parison is preferably 0.5 to 2.5 mm, more preferably 1.0 to 2.0 mm.

As a resin for forming the resin layer, there may be used the same resin as used to form the foam layer. Any other suitable resins may also be used as long as the objects of the present invention are not adversely affected. Examples of the resin include a polyester resin, a polyamide resin and a polycarbonate resin. Further, when the resin from which the resin layer is formed has a low adhesiveness to the polypropylene-based resin constituting the foam layer, it is of course possible to bond and laminate the two layers by any suitable known adhesion means such as by using an adhesive layer interposed therebetween.

In the production of the hollow foamed molded article of the present invention, the polypropylene-based resin is fed to an extruder and heated and kneaded therein to obtain a molten resin. This is further mixed with a physical blowing agent under a pressure to form a foamable molten resin. The foamable molten resin is extruded through a die 3 to obtain a foam parison 2 having a foam layer 21 in a softened state.

The foam layer of the hollow foamed molded article (hereinafter occasionally referred to as foam article foam layer) has an apparent density of 0.20 to 0.65 g/cm$^3$. When the apparent density of the molded article foam layer is excessively low, the thickness of the hollow foamed molded article tends to be excessively thick. In this case, even when the thickness of the molded article falls within the above-described range, there is a possibility that corrugation forms excessively during foaming and that elongation of the foam parison during blow-molding becomes deteriorated. As a result, there is a possibility that the hollow foamed molded article having molded article thickness variation coefficient Cv of 50% or less cannot be obtained. There is also a possibility that the mechanical strengths such as bending strength and compressive strength tend to be unsatisfactory. On the other hand, when the apparent density of the foam layer is excessively high, there is a possibility that the light weight property and heat insulating property of the hollow foamed molded article are deteriorated. From the above point of view, the lower limit of the apparent density of the molded article foam layer is preferably 0.25 g/cm$^3$, more preferably 0.30 g/cm$^3$, still more preferably 0.35 g/cm$^3$, while the upper limit of the apparent density is preferably 0.55 g/cm$^3$, more preferably 0.50 g/cm$^3$, particularly preferably 0.45 g/cm$^3$.

The apparent density of the hollow foamed molded article may be adjusted to a desired value by controlling the apparent density of the foam parison from which the hollow foamed molded article is obtained. The apparent density of the foam parison may be controlled by a using amount of a blowing agent which will be described hereinafter. In actual, however, because the foam parison is in a softened state, it is not possible to measure the apparent density thereof. Therefore, the apparent density of the hollow foamed molded article is adjusted by adjusting the using amount of the blowing agent on the basis of a difference in apparent density between the aimed hollow foamed molded article and the obtained hollow foamed molded article and by repeating such the procedures.

As used herein, the apparent density of the molded article foam layer is as measured by the following method. Samples are cut out from the hollow foamed molded article is cut at three circumferentially equally spaced apart locations in each of the three positions consisting of near the midpoint of the direction of the hollow of the molded article and both end portions thereof (a position where the hollow foamed molded article has a special shape should be avoided for the measurement). The apparent density is an arithmetic mean of the apparent density values of the thus obtained nine samples. The apparent density of each sample is calculated by dividing the weight (g) thereof by the volume (cm$^3$) thereof. When the molded article has a resin layer, the resin layer is peeled away from the hollow foamed molded article and only the foam layer is measured for the apparent density thereof.

The blowing agent used for the formation of the foam layer is a physical blowing agent. Preferably, the physical blowing agent is used by itself. As the physical foaming agent, there may be mentioned, for example, aliphatic hydrocarbons such as propane, n-butane, isobutane, cyclobutane, n-pentane, isopentane, cyclopentane, n-hexane, isohexane and cyclohexane, halogenated hydrocarbons such as methyl chloride, ethyl chloride, 1,1,1,2-tetrafluoroethane and 1,1-difluoroethane, alcohols such as methanol and ethanol, ethers such as dimethyl ether, diethyl ether and methyl ethyl ether, carbon dioxide, nitrogen, argon and water. These physical blowing agents may be used singly or in combination of two or more thereof. If desired, the physical blowing agent may be used together with a chemical blowing agent. The chemical blowing agent may be azodicarbonamide, etc.

Among these blowing agents, a physical blowing agent containing 20 to 100 mol % of carbon dioxide (inclusive of a physical blowing agent composed only of carbon dioxide) is preferably used, because the molding cycle can be reduced, and the dimensional stability of the hollow foamed molded article can be improved and, further, because the wall thickness of the hollow foamed molded article can be made thin.

The amount of the blowing agent is suitably determined in consideration of the desired apparent density (expansion ratio). Generally, the physical blowing agent is used in an amount of 0.01 to 1.2 mols per 1 kg of the polypropylene-based resin.

A cell controlling agent such as talc may be incorporated into the raw material polypropylene-based resin for controlling the cell diameter of the hollow foamed molded article. The cell controlling agent is generally used in the form of a master batch which comprises a base resin composed mainly of a polyolefin-based resin such as a polyethylene-based resin and a polypropylene-based resin, and the cell controlling agent. The cell controlling agent is generally used in an amount of 0.05 to 10 parts by weight per 100 parts by weight of the polypropylene-based resin or polyethylene-based resin.

If desired, an additive or additives such as a flame retardant, a fluidity improver, a UV absorbing agent, an electrical conductivity imparting agent, an antistatic agent, a colorant, a thermal stabilizer, an antioxidant and an inorganic filler may be also incorporated into the foam layer of the hollow foamed molded article and, if needed, into the resin layer provided outside and/or inside the foam layer.

As described above, the hollow foamed molded article of the present invention may be prepared by forming a relatively thin-walled foam parison by using the specific polypropylene-based resin while adjusting a die lip clearance to a narrow value and further adjusting an apparent density of a foam layer of the foam parison to a large value to the extent that the light weight of the foam layer is not deteriorated. Further, the foam parison is stretched in the extrusion direction. The stretched foam parison is then subjected to blow-molding.

The hollow foamed molded article of the present invention may be prepared by blow-molding a foam parison in a stretched state by a method which is not specifically limited. For example, as a method for forming a foam parison which is in a stretched state, there may be mentioned a method in which the parison that has been extruded is immediately stretched in the extrusion direction at a speed higher than the extrusion speed of the foam parison, a method in which the parison that has been extruded is allowed to draw down by its own weight by retarding the timing of the closure of the mold, or a method in which the foam parison that has been extruded is stretched in the extrusion direction at a speed higher than the drawing down speed of the foam parison.

Since the foam layer of the hollow foamed molded article of the present invention has a high equilibrium compliance $Je_0$ value, the foam parison has been uniformly stretched in the extrusion direction in the above stretching step. Thus, since the foam parison has a thin and uniform thickness, the hollow foamed molded article obtained therefrom has a thin and uniform thickness. Among the above methods, the method in which the foam parison that has been extruded is immediately stretched in the extrusion direction is preferred, because the thickness of the hollow foamed molded article can be easily controlled and made uniform.

The average thickness T of the hollow foamed molded article of the present invention may be controlled as follows. First, a foam parison is formed and is blow-molded as such to obtain a hollow foamed molded article. The average thickness $T_0$ is then measured. Based on the wall thickness $T_0$, a degree of stretching (stretch ratio) of the foam parison is determined. A foam parison is then extruded while adjusting the amount of the extruded resin based on the determined stretch ratio. The extruded foam parison is stretched until the determined stretch ratio is reached. The stretched foam parison is blow-molded to obtain a hollow foamed molded article. The average thickness T' of this molded article is then measured. When there is still a difference between the average thickness T' of this foamed molded article and the average thickness T of the intended foamed molded article, a hollow foamed molded article is again produced with a stretch ratio which is adjusted based on this difference. The resulting molded article is measured for its average thickness. The above procedures are repeated to adjust the average thickness of the hollow foamed molded article.

The upper limit of the stretch ratio is preferably 2.5 or less, more preferably 2 or less, still more preferably 1.8 or less. When the stretch ratio is excessively high, the cells will deform so significantly that there is a possibility that the mechanical strength of the hollow foamed molded article is deteriorated. The lower limit of the stretch ratio, on the other hand, is properly determined in consideration of the above-mentioned average thickness $T_0$ and the average thickness T and is generally about 1.2 for the purpose of obtaining the hollow foamed molded article of the present invention.

The term "stretch ratio" described above is a value determined by the following method. First, a foam parison is formed. The length L1 in the extrusion direction of the foam parison (i.e. distance from the exit of the die lip to the lower edge of the foam parison) is measured immediately after the completion of the extrusion. Next, the foam parison is stretched in the extrusion direction. The length L2 of the stretched foam parison in the extrusion direction just before closure of the mold (i.e. the length of the stretched foam parison from the exit of the die lip to the lower edge of thereof) is measured. The stretch ratio is calculated by dividing L2 by L1. Incidentally, when the stretching is carried out by the above described "method in which the parison that has been extruded is immediately stretched in the extrusion direction at a speed higher than the extrusion speed of the foam parison", the stretch ratio is determined by previously forming a foam parison and the length L1' in the extrusion direction thereof is measured. Next, a foam parison is separately formed under the same conditions as those used for the formation of the foam parison having the length L1', (i.e. the same amount of the resin is extruded in the same extrusion speed), while stretching the foam parison in the extrusion direction. The length L2 of the stretched foam parison is measured in the same manner as described above. The stretch ratio is calculated by dividing L2 by L1'.

As a consequence of the above stretching process, the cells of the resulting hollow foamed molded article are also stretched in the longitudinal direction of the molded article. More specifically, the average of ratios a/c of cell diameters "a" in the thickness direction of the molded article to cell diameters "c" in the longitudinal direction (extrusion direction) of the molded article is 0.5 or less. In general, when a hollow foamed molded article is prepared without intentionally conducting the stretching in a manner as described above, the average of a/c ratios of the resulting molded article is 0.6 or more, because the amount of draw-down of the foam parison is small due to a high equilibrium compliance $Je_0$. When the average of a/c ratios is less than 0.1, (i.e. when the cells are excessively deformed in the longitudinal direction), not only the mechanical strength of the hollow foamed molded article is lowered (this results in a possibility that the strength required in an intended use is not satisfied) but also there is a possibility that a good molded article itself is not obtainable because of excessive stretching of the foam parison.

It is preferred that the average of cell diameters "a" in the thickness direction of the hollow foamed molded article of the present invention be 0.05 to 0.5 mm. When the average of the cell diameters "a" is within the above range, the hollow foamed molded article has excellent heat insulating property, appearance and mechanical strength. When the average of the cell diameters "a" is excessively small, there is a possibility that the dimensional stability and uniformity of thickness of the hollow foamed molded article are deteriorated. From this point of view, the lower limit of the average of the cell diameters "a" of the hollow foamed molded article is 0.07 mm or more, more preferably 0.1 mm or more.

When the above-described stretching process is carried out, the cell diameters "c" in the longitudinal direction of the molded article tend to be greater than the cell diameters "b" in the circumferential direction of the molded article, and the average of ratios c/b of the cell diameters "c" to the cell diameters "b" tends to be 1.5 or more, although this depends on the stretch ratio and widening ratio adopted in the molding of the foam parison. The upper limit is not specifically limited but is generally 5.

In the present invention, the terms "average of cell diameters "a" in the thickness direction", "average of cell diameters "c" in the longitudinal direction" and "average of the cell diameter ratios a/c" of the foamed molded article are intended to refer to values as measured by the measurement shown below. The measurement is carried out at three positions of the hollow foamed molded article including a center part and two opposite end parts (end portions which are formed for fitting engagement with other parts should be avoided) in the longitudinal direction thereof (those parts of the molded article at which cells are excessively deformed should be avoided for the measurement). Two vertical cross sections which are obtained at each of the three positions and which are in a paired opposed relationship are subjected to the measurement so that measurements are carried out for six sections in total.

The average of cell diameters "a" in the thickness direction, average of cell diameters "c" in the longitudinal direction and average of the cell diameter ratios a/c" of the molded article are measured by the following method. First, a hollow portion of the hollow foamed molded article is cut in a direction (longitudinal direction) perpendicular to the circumferential direction and the thickness direction into two nearly equal halves to obtain two vertical cross sections. Each of the two cross sections which are in a paired opposed relationship is enlarged and projected using a microscope or the like. On the projected image, a line segment ($\alpha$) extending through the entire thickness of the foamed blow-molded article is drawn at a position near the center of the widthwise direction that is perpendicular to the thickness direction. The length L3 of the line segment ($\alpha$) on the image is measured. In this case, when the thickness at the position near the center of the widthwise direction of the projected image is considerably smaller than those of the other positions, the selected image should not be used for the measurement; i.e. another portion of the cross section should be projected and subjected to the similar measurement. Next, two parallel lines which are spaced apart a distance L3 from each other and which extend through the entire thickness of the molded article are drawn on both sides of the line segment ($\alpha$) such that the line segment ($\alpha$) represents the center line thereof. All of the cells that are present between the two lines (except for those cells which cross the two lines) are subjected to the measurement as follows. Namely, each of the cells is measured for the maximum length in the thickness direction of its inside diameter and the maximum length in the longitudinal direction of its inside diameter. The cell diameters "a" and "c" of each of the cells are calculated by dividing the measured values by the magnification of the enlarged photo image. Further, the value "a" is divided by the value "c" for each of the cells to obtain a cell diameter ratio a/c for each cell. Similar procedures are repeated for all of the above-mentioned six sections. The arithmetic means of the thus obtained "a", "c" and a/c of all of the measured cells represent the average of cell diameters "a" in the thickness direction, average of cell diameters "c" in the longitudinal direction and average of the cell diameter ratios a/c" of the molded article, respectively.

The average of cell diameters "b" in the circumferential direction of the molded article is measured by the following method. The measurement is carried out for cross sections of the molded article taken at three positions of the blow-molded article including a center part and two opposite end parts (end portions which are formed for fitting engagement with other parts should be avoided) in the longitudinal direction thereof. Two arbitrarily selected portions of each of the cross sections taken at the three positions are subjected to the measurement so that measurements are carried out for six sections in total. First, the cross section taken in the direction perpendicular to the longitudinal direction of the hollow foamed molded article is projected using a microscope or the like to obtain an enlarged image. On the projected image, a line ($\beta$) extending through the entire thickness of the foamed blow-molded article is drawn at a position near the center of the widthwise direction that is perpendicular to the thickness direction. The length L4 of the line segment ($\beta$) on the image is measured. In this case, when the thickness at the position near the center of the widthwise direction of the projected image is considerably smaller than those of the other positions, the selected image should not be used for the measurement; i.e. another portion of the cross section should be projected and subjected to the similar measurement. Next, two parallel lines which are spaced apart a distance L4 from each other and which extend through the entire thickness of the molded article are drawn on both sides of the line segment ($\beta$) such that the line segment ($\beta$) represents the center line thereof. All of the cells that are present between the two lines (except for those cells which cross the two lines) are subjected to the measurement as follows. Namely, each of the cells is measured for the maximum length in the widthwise direction of its inside diameter. The cell diameter "b" of each of the cells is calculated by dividing the measured value by the magnification of the enlarged photo image. Similar procedures are repeated for all of the above-mentioned six sections. The arithmetic mean of the thus obtained "b" of all of the measured cells represent the average of cell diameters "b" in the circumferential direction of the molded article.

An average of ratios c/b of the cell diameter "b" to the cell diameter "c" is determined by dividing the average of cell diameters "c" in the longitudinal direction of the molded article obtained as above by the average of cell diameters "b" in the circumferential direction.

As described above, even when the equilibrium compliance $Je_0$ of the polypropylene-based resin foam layer is high, the hollow foamed molded article can achieve an average thickness T of 1 to 5 mm and an apparent density "d" of the foam layer of 0.20 to 0.65 g/cm$^3$ by blow-molding a foam parison in a stretched state.

In foam blow-molding, it tends to become difficult to obtain a molded article having a thin average thickness T as the apparent density "d" of the foam layer decreases. In particular, it is difficult to obtain a thin-walled hollow foamed molded article which satisfies the relationship of T×d≦1 [mm·g/cm³] between the average thickness T and the apparent density "d". It is more difficult to obtain the relationship of T×d≦1 [mm·g/cm³]. When a foam parison which has been uniformly stretched as described above is blow-molded, however, it is possible to achieve the above relationship.

It is preferred that, before catching the foam parison 2 by the molds, a gas such as air be previously blown from the gas injection pipe 5 into the foam parison 2, while preventing the cells of the foam layer 21 from being destroyed, to widen the foam parison such that the maximum width of the widened foam parison is 0.7 to 1.5 times, preferably 0.8 to 1.5 times, more preferably 0.85 to 1.3 times, the maximum width of the aimed hollow foamed molded article (hereinafter the ratio of the maximum width of the foam parison to the maximum width of the hollow foamed molded article is occasionally referred to as widening ratio). By the widening of the foam parison, it is possible to effectively prevent variation of the wall thickness of the hollow foamed molded article due to excessive stretching of the foam parison during the course of the blow-molding or due to an excessive increase in radius of curvature of the foam parison relative to that of the mold cavity, which increase may result in an increase of the drawing of the foam parison during the blow-molding after the closure of the molds. Namely, the uniformity of the wall thickness of the obtained hollow foamed molded article is further improved. In the widening of the foam parison, the foam parison may be pinched and collapsed at its lower portion to facilitate the widening operation of the foam parison.

Figure 4:
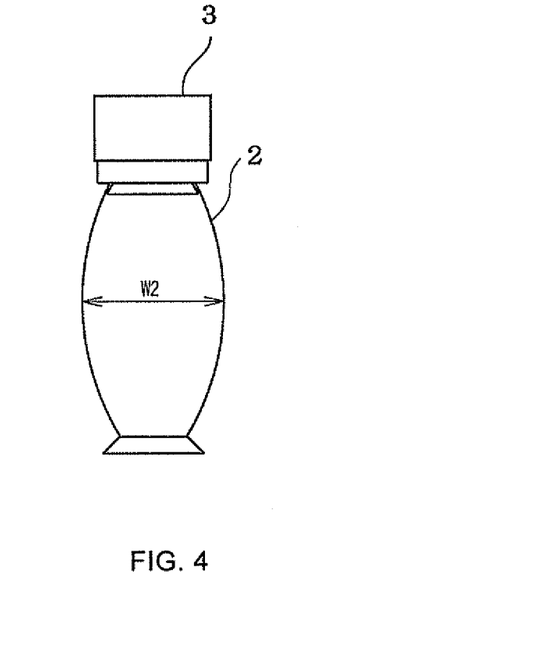
FIG. 4 is a view explanatory of the maximum width of a foam parison.
Figure 5:
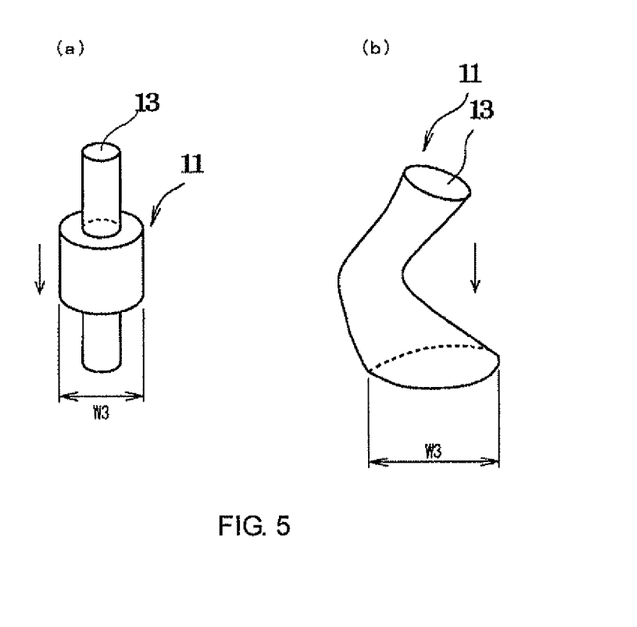

As used in the present specification, the term "maximum width" of the foam parison is intended to refer to the maximum outer diameter W2 (as shown in FIG. 4) of the cross-section of the foam parison in the direction perpendicular to the direction in which the foam parison is extruded. The term "maximum width" of the hollow foamed molded article is intended to refer to the maximum distance W3 (as shown in FIGS. 5(a) and 5(b)) between the left side and right side of the molded article in the direction perpendicular to the extrusion direction indicated by the arrow. The maximum distance is generally the same as the maximum distance between the left side end and right side end of the mold cavity (defined by the closed molds for molding the hollow foamed molded article) in the direction perpendicular to the feed direction of the foam parison into the molds. Incidentally, FIG. 4 is a view explanatory of the maximum width of the foam parison, and FIG. 5 is a view explanatory of the maximum width of the hollow foamed molded article. In the drawings, the reference numeral 3 denotes the die, 2 denotes the foam parison, 11 denotes the hollow foamed molded article and 13 denotes the hollow portion.

Figure 6:
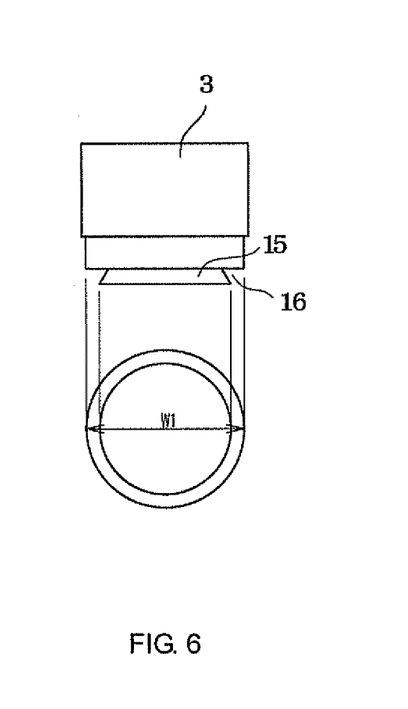
FIG. 6 is a view explanatory of a lip diameter of a circular die.

In the present invention, it is preferred that a circular die having a lip diameter which is 0.2 to 0.5 time, more preferably 0.3 to 0.45 time, the maximum width of the hollow foamed molded article be used, since the uniformity of the thickness of the obtained hollow foamed molded article can be further improved. Incidentally FIG. 6 is a view explanatory of the lip diameter W1 of the circular die. In the Figure, the reference numeral 15 denotes a die core and 16 denotes the die lip.

In the production of the hollow foamed molded article of the present invention, it is also preferred that the molds be closed in the state where the maximum pressure inside the parison which has been placed therebetween is 0.01 to 0.40 MPa(G). By this expedience, the effect of reducing the thickness variation of the obtained hollow foamed molded article is further improved. From this point of view, the closure of the molds is preferably performed in the state where the maximum inside pressure is within the range of 0.03 to 0.30 MPa(G), more preferably 0.15 to 0.30 MPa(G).

The adjustment of the maximum width of the foam parison and the maximum inside pressure of the foam parison may be done by controlling the pressure of a pressurized gas to be blown into the parison. The maximum inside pressure can be measured as a gauge pressure by, for example, a method in which pressure gauge is attached to a nozzle for blowing the pressurized gas into the parison.

As described above, the foam parison is placed between molds and the closure of the molds is completed in the state where the maximum pressure inside the foam parison is within the range of 0.01 to 0.40 MPa(G). When a gas such as high pressure air is further fed under pressure beyond the maximum pressure inside the foam parison, the pressure of the gas fed under pressure is generally 0.05 to 0.50 MPa(G), preferably 0.20 to 0.40 MPa(G), and is extremely lower than the pressure used in blow-molding of a non-foam resin.

After the foam parison 2 sandwiched between the molds has been shaped into a desired shape, the molded product is cooled and taken out of the molds to obtain the hollow foamed molded article.

The hollow foamed molded article of the present invention is light weight and has a thin uniform thickness and, therefore, may be suitably used for various applications such as receptacles, ducts, automobile parts and electric appliance parts. The molded article is particularly suitably used as air conditioner ducts for automobiles. The molded article taken out of the molds is generally hollow but does not have openings. Namely, except the hole mark of the air injection pipe, the entire surface of the molded article is closed. To obtain the hollow foamed molded article product such as shown in FIG. 2, the obtained molded article is cut to form openings.

EXAMPLES

The hollow foamed blow-molded article according to the present invention and production method therefor will next be described in detail by concrete examples. The present invention is, however, not limited only to the examples in any way.

Polypropylene-based resin A used in the examples and comparative examples as a raw material is propylene homopolymer "WB130HMS" manufactured by Borealis AG and has a density of 0.900 g/cm³, equilibrium compliance $Je_0$ of $2.2 \times 10^{-3}$ $Pa^{-1}$, swell S of 2.7 and MFR of 2 g/10 min.

Polypropylene-based resin B used as a raw material is a recycled product from the propylene homopolymer "WB130HMS" and has a density of 0.900 g/cm³, equilibrium compliance $Je_0$ of $1.5 \times 10^{-3}$ $Pa^{-1}$, swell S of 1.1, and MFR of 8 g/10 min.

Polypropylene-based resin C used as a raw material is ethylene-propylene block copolymer "NEW FORMER F63312" manufactured by Japan Polypropylene Corporation and has a density of 0.900 g/cm³, equilibrium compliance $Je_0$ of $9.5 \times 10^{-3}$ $Pa^{-1}$, swell S of 2.6 and MFR of 4 g/10 min.

As a cell controlling agent, a master batch composed of 80% by weight of low density polyethylene and 20% by weight of talc was used.

Hollow foamed blow-molded articles having a maximum width of 180 mm for use as air conditioner ducts for automobiles were produced in Examples 1 to 10, Reference Example 1 and Comparative Examples 1 to 4.

Examples 1 to 9

A raw material polypropylene-based resin having a formulation as shown in Table 2 was used. Carbon dioxide in an amount (mole per 1 kg of the polypropylene-based resin) as shown in Table 2 as a blowing agent was added to the polypropylene-based resin together with the above cell controlling agent master batch in an amount as shown in Table 2 (part by weight per 100 parts by weight of the polypropylene-based resin). The mixture was extruded through a circular die having a die lip diameter of 70 mm with a die lip clearance as shown in Table 2 to form a foam parison. The die lip clearance is the maximum width of the resin passage of the die during the extrusion process.

Immediately after the start of the extrusion the foam parison, the foam parison was pinched at a lower end portion thereof and stretched in the extrusion direction at a speed faster than the extrusion speed thereof until a stretch ratio shown in Table 2 was reached. Next, air was blown into the thus stretched foam parison to widen the foam parison. The foam parison was placed between molds, and the molds were closed. In this case, the maximum pressure inside the foam parison was as shown in Table 2 in the column of "parison inside pressure". Then, pressurized air (the pressure is shown in Table 2) was blown into the foam parison placed in the molds to blow-mold the foam parison into the desired shape. After cooling, the molds were opened to take out a hollow foamed molded article therefrom.

Example 10

A foam parison was prepared under the same conditions as those in Example 1. Immediately after the foam parison had been extruded, a lower end portion thereof was pinched, and the foam parison was stretched in the extrusion direction until a stretch ratio of 1.4 was reached. This was then blow-molded under the same conditions as those in Example 1 to obtain a hollow foamed molded article.

The equilibrium compliance $Je_0$, swell S, apparent density d, average molded article thickness T, minimum thickness $T_{min}$, thickness variation coefficient Cv, weight W, average cell diameters (a, b and c) in respective directions and average ratios of cell diameters (a/c and c/b) of each of the hollow foamed molded articles obtained in the above Examples are shown in Table 3. In the measurement of equilibrium compliance $Je_0$ and swell S, the foam layer of each hollow foamed molded article was degassed in a vacuum oven at 230° C. and the resulting degassed foam layer was used as a sample for the measurement.

The hollow foamed molded articles obtained in the above Examples were found to have thin and uniform thickness, even though the equilibrium compliance $Je_0$ of the foam layers thereof were greater than $2.0\times10^{-3}$ $Pa^{-1}$.

Reference Example 1

A raw material polypropylene-based resin having a formulation as shown in Table 2 was used. Carbon dioxide ($CO_2$) in an amount as shown in Table 2 as a blowing agent was added to the polypropylene-based resin together with the above cell controlling agent master batch in an amount as shown in Table 2 (part by weight per 100 parts by weight of the polypropylene-based resin). The mixture was extruded through a circular die having a die lip diameter of 70 mm with a die lip clearance as shown in Table 2 to form a foam parison. Immediately after the foam parison had been extruded, air was blown into the foam parison (which had not been stretched) to widen the foam parison. The foam parison was placed between molds, and the molds were closed. Then, pressurized air (the pressure is shown in Table 2) was blown into the foam parison placed in the molds to blow-mold the foam parison into the desired shape. After cooling, the molds were opened to take out a hollow foamed molded article therefrom. The obtained hollow foamed molded article, whose foam layer had an equilibrium compliance $Je_0$ of $1.5\times10^{-3}$ $Pa^{-1}$ and an apparent density d of 0.35 $g/cm^3$, had an average molded article thickness T of 3.2 mm and a variation coefficient Cv of 18%.

Comparative Example 1

A foam parison was extruded under the same conditions as those in Reference Example 1. Immediately after the foam parison had been extruded, a lower end portion thereof was pinched, and the foam parison was stretched in the extrusion direction at a speed faster than the extrusion speed thereof until a stretch ratio shown in Table 2 was reached. Next, air was blown into the thus stretched foam parison to widen the foam parison. The foam parison was placed between molds, and the molds were closed. Then, pressurized air (the pressure is shown in Table 2) was blown into the foam parison placed in the molds to blow-mold the foam parison into the desired shape. After cooling, the molds were opened to take out a hollow foamed molded article therefrom. Since the foam layer of the obtained hollow foamed molded article had an equilibrium compliance $Je_0$ of $1.5\times10^{-3}$ $Pa^{-1}$, the foam parison had not been uniformly stretched in the above stretching step. Therefore, the hollow foamed molded article had an average molded article thickness T of 2.1 mm and a variation coefficient Cv of 58%, indicating that the uniformity of the thickness was unsatisfactory.

Comparative Example 2

A foam parison was extruded under the same conditions as those in Example 1. Immediately after the foam parison had been extruded, air was blown into the foam parison (which had not been stretched) to widen the foam parison. The foam parison was placed between molds, and the molds were closed. Then, pressurized air (the pressure is shown in Table 2) was blown into the foam parison placed in the molds to blow-mold the foam parison into the desired shape. After cooling, the molds were opened to take out a hollow foamed molded article therefrom. The obtained hollow foamed molded article had an average molded article thickness T of 5.4 mm.

Comparative Example 3

A foam parison was extruded in the same manner as that in Comparative Example 2 except that the die lip clearance was changed from 2.0 mm to 1.0 mm. After having been extruded, the foam parison (which had not been stretched) was blow-molded under the same conditions as those in Comparative Example 2 to obtain a hollow foamed molded article. Because the lip clearance at the time of the extrusion is small, significant corrugation of the foam parison occurred. As a consequence, the obtained hollow foamed molded article had an average molded article thickness T of 2.8 mm and a variation coefficient Cv of 62%, indicating that the uniformity of the thickness was unsatisfactory.

Comparative Example 4

A foam parison was extruded in the same manner as that in Example 1 except that the amount of the blowing agent was changed from 0.36 mol/kg to 0.45 mol/kg and that the amount of the cell controlling agent master batch was changed from 3 parts by weight to 0.5 part by weight. Immediately after the foam parison had been extruded, a lower end portion thereof was pinched, and the foam parison was stretched in the extrusion direction at a speed faster than the extrusion speed thereof until a stretch ratio shown of 1.4 was reached. Next, air was blown into the thus stretched foam parison to widen the foam parison (pre-blowing). The foam parison was placed between molds, and the molds were closed. Then, pressurized air (the pressure is shown in Table 2) was blown into the foam parison placed in the molds to blow-mold the foam parison into the desired shape. After cooling, the molds were opened to take out a hollow foamed molded article therefrom. The obtained molded article had an average molded article thickness T of 4.8 mm. However, because of an excessively low apparent density (excessively high expansion ratio), the foam parison was not uniformly stretched so that the variation coefficient Cv was 58%, indicating that the uniformity of the thickness was unsatisfactory.

TABLE 2

| | Foam parison production conditions | | | | | Blow-molding conditions | | |
|---|---|---|---|---|---|---|---|---|
| | Raw material | Amount of cell controlling agent master batch | Blowing agent | | Die lip clearance | Stretching ratio | Parison inside pressure | Blowing pressure |
| | resin Weight ratio | Part by weight | Kind | Amount mol/kg | mm | — | MPa (G) | MPa (G) |
| Example 1 | A/C = 50/50 | 3.0 | $CO_2$ | 0.18 | 2.0 | 1.4 | 0.20 | 0.25 |
| Example 2 | A/C = 50/50 | 3.0 | $CO_2$ | 0.18 | 2.0 | 2.0 | 0.20 | 0.25 |
| Example 3 | A/C = 50/50 | 3.5 | $CO_2$ | 0.15 | 1.8 | 1.8 | 0.20 | 0.25 |
| Example 4 | A/C = 50/50 | 3.5 | $CO_2$ | 0.15 | 1.5 | 2.1 | 0.20 | 0.25 |
| Example 5 | A/C = 50/50 | 5.0 | $CO_2$ | 0.08 | 1.5 | 1.8 | 0.20 | 0.25 |
| Example 6 | A/C = 50/50 | 1.0 | $CO_2$ | 0.36 | 2.0 | 2.0 | 0.20 | 0.25 |
| Example 7 | A/C = 50/50 | 1.0 | $CO_2$ | 0.36 | 2.0 | 1.4 | 0.20 | 0.25 |
| Example 8 | A/C = 20/80 | 3.0 | $CO_2$ | 0.18 | 2.0 | 2.3 | 0.25 | 0.30 |
| Example 9 | A/C = 50/50 | 3.5 | $CO_2$ | 0.15 | 2.0 | 1.3 | 0.20 | 0.25 |
| Example 10 | A/C = 50/50 | 3.0 | $CO_2$ | 0.18 | 2.0 | 1.4 | 0.20 | 0.25 |
| Ref. Ex. 1 | A/C = 20/80 | 2.5 | $CO_2$ | 0.18 | 2.0 | 1.0 | 0.20 | 0.25 |
| Comp. Ex. 1 | A/C = 20/80 | 2.5 | $CO_2$ | 0.18 | 2.0 | 1.4 | 0.20 | 0.25 |
| Comp. Ex. 2 | A/C = 50/50 | 1.0 | $CO_2$ | 0.36 | 2.0 | 1.0 | 0.20 | 0.25 |
| Comp. Ex. 3 | A/C = 50/50 | 1.0 | $CO_2$ | 0.36 | 1.0 | 1.0 | 0.20 | 0.25 |
| Comp. Ex. 4 | A/C = 50/50 | 0.5 | $CO_2$ | 0.45 | 2.0 | 1.4 | 0.20 | 0.25 |

TABLE 3

| | Hollow foamed blow-molded article | | | | | | | | | | | Cell diameter ratio | |
|---|---|---|---|---|---|---|---|---|---|---|---|---|---|
| | Foam layer | | | Molded article thickness | | | | | Cell diameter | | | | |
| | $Je_0$ *1 $\times 10^{-3} Pa^{-1}$ | S *2 — | d *3 g/cm$^3$ | T *4 mm | $T_{min}$ *5 mm | Cv *6 % | T × d mm · g/cm$^3$ | W *7 g | a *8 mm | b *9 mm | c *10 mm | a/c — | c/b — |
| Example 1 | 6.6 | 2.2 | 0.32 | 2.8 | 2.1 | 14 | 0.9 | 194 | 0.13 | 0.17 | 0.32 | 0.41 | 1.88 |
| Example 2 | 6.6 | 2.2 | 0.34 | 2.1 | 1.5 | 16 | 0.7 | 155 | 0.10 | 0.13 | 0.45 | 0.22 | 3.46 |
| Example 3 | 6.6 | 2.2 | 0.35 | 2.1 | 1.6 | 14 | 0.7 | 159 | 0.11 | 0.14 | 0.40 | 0.28 | 2.86 |
| Example 4 | 6.6 | 2.2 | 0.37 | 1.5 | 1.0 | 19 | 0.6 | 120 | 0.09 | 0.12 | 0.45 | 0.20 | 3.75 |
| Example 5 | 6.6 | 2.2 | 0.53 | 1.5 | 1.2 | 10 | 0.8 | 172 | 0.12 | 0.16 | 0.45 | 0.27 | 2.81 |
| Example 6 | 6.6 | 2.2 | 0.27 | 2.7 | 1.6 | 23 | 0.7 | 158 | 0.11 | 0.14 | 0.47 | 0.23 | 3.36 |
| Example 7 | 6.6 | 2.2 | 0.27 | 3.8 | 2.8 | 15 | 1.0 | 222 | 0.12 | 0.16 | 0.45 | 0.27 | 2.81 |
| Example 8 | 9.1 | 2.1 | 0.35 | 2.2 | 1.6 | 17 | 0.8 | 166 | 0.12 | 0.16 | 0.66 | 0.18 | 4.13 |
| Example 9 | 5.8 | 1.8 | 0.34 | 2.2 | 1.9 | 10 | 0.8 | 169 | 0.14 | 0.18 | 0.30 | 0.47 | 1.67 |
| Example 10 | 6.6 | 2.2 | 0.32 | 2.9 | 2.0 | 16 | 0.9 | 201 | 0.13 | 0.17 | 0.28 | 0.46 | 1.65 |
| Ref. Ex. 1 | 1.5 | 2.1 | 0.32 | 2.8 | 1.8 | 18 | 0.9 | 194 | 0.13 | 0.17 | 0.19 | 0.68 | 1.12 |
| Comp. Ex. 1 | 1.5 | 2.1 | 0.34 | 2.1 | 0.5 | 58 | 0.7 | 155 | 0.09 | 0.12 | 0.42 | 0.21 | 3.50 |
| Comp. Ex. 2 | 6.6 | 2.2 | 0.27 | 5.4 | 3.7 | 18 | 1.5 | 316 | 0.21 | 0.27 | 0.28 | 0.75 | 1.04 |
| Comp. Ex. 3 | 6.6 | 2.2 | 0.27 | 2.8 | 0.9 | 62 | 0.8 | 164 | 0.11 | 0.14 | 0.16 | 0.69 | 1.14 |
| Comp. Ex. 4 | 6.6 | 2.2 | 0.18 | 4.8 | 1.8 | 58 | 0.9 | 187 | 0.13 | 0.17 | 0.32 | 0.41 | 1.88 |

In Table 2, "A/C=50/50" for "raw material resin" indicates that the raw material resin is obtained by dry-mixing resin A and resin C with a mixing weight ratio of 50:50. This expression also applies to the other raw material resins. The unit "MPa(G)" for the pressure in Table 2 shows a gauge pressure. The symbols in Table 3 are as follows:

*1: Equilibrium compliance $Je_0$
*2: Swell S
*3: Apparent density d
*4: Average thickness T
*5: Minimum thickness $T_{min}$
*6: Variation coefficient Cv
*7: Weight W
*8: Average in the thickness direction a
*9: Average in the circumferential direction b
*10: Average in the longitudinal direction c As described in the foregoing, when a molded article is no good in precision of the thickness and has a thin portion, it is necessary to take the thin portion into consideration in designing the average thickness of the whole molded article. Therefore, it is inevitable to adopt a high average thickness of the whole molded article. As a result, achievement of light weight is insufficient. The hollow foamed molded article of the present invention, on the other hand, has a thin and uniform thickness even when the shape thereof is complicated. Therefore, in spite of its thin average thickness, the molded article can achieve required strength and light weight. Accordingly, the hollow foamed molded article of the present invention is suited for use as an air conditioner duct for vehicles which is required to have light weight and complicated shape of, for example, a three-dimensionally curved shape.

EXPLANATION OF REFERENCE NUMERALS

2: Foam parison
21: Foam layer of foam parison
22: Non-foamed thermoplastic resin layer
3: Die
4: Mold
5: Gas feed port
6: Outer surface of foam parison
7: Interior surface of mold
11: Hollow foamed molded article
12: Tubular portion of molded article
13: Hollow portion
14: Residual mark
15: Die core
16: Die lip

What is claimed is:

1. A hollow foamed blow-molded article having a polypropylene-based resin foam layer,
    wherein the polypropylene-based resin foam layer has an equilibrium compliance $Je_0$ of $2.0\times10^{-3}$ $Pa^{-1}$ to $15.0\times10^{-3}Pa^{-1}$ and a swell S of 2.5 or less,
    wherein the foam layer has an apparent density "d" of 0.20 to 0.65 g/cm$^3$ and a ratio a/c of an average cell diameter "a" in the thickness direction of the molded article to an average cell diameter "c" in the longitudinal direction of the molded article of 0.1 to 0.5, and
    wherein the hollow foamed blow-molded article has an average molded article thickness T of 1 to 5 mm and a variation coefficient Cv of the molded article thickness of 50% or less.

2. A hollow foamed blow-molded article as recited in claim 1, wherein the average molded article thickness T of the hollow foamed blow-molded article is 1 mm or more and less than 2.3 mm.

3. A hollow foamed blow-molded article as recited in claim 1, wherein the apparent density "d" of the polypropylene-based resin foam layer is 0.25 to 0.65 g/cm$^3$.

4. A hollow foamed blow-molded article as recited in claim 1, wherein the equilibrium compliance $Je_0$ of the polypropylene-based resin foam layer is $3.0\times10^{-3}$ $Pa^{-1}$ to $15.0\times10^{-}Pa^{-1}$ and the swell S thereof is 1 to 2.5.

5. A hollow foamed blow-molded article as recited in claim 1, wherein the hollow foamed blow-molded article is an air conditioner duct for vehicles.

6. A hollow foamed blow-molded article as recited as in claim 1, wherein the equilibrium compliance $Je_0$ is $5.0\times10^{-3}$ $Pa^{-1}$ to $10.0\times10^{-3}$ $Pa^{-1}$.

* * * * *